Nov. 10, 1942.    J. W. COX    2,301,373
MULTICHANNEL TELEGRAPH SYSTEM
Filed Oct. 26, 1940    3 Sheets-Sheet 1
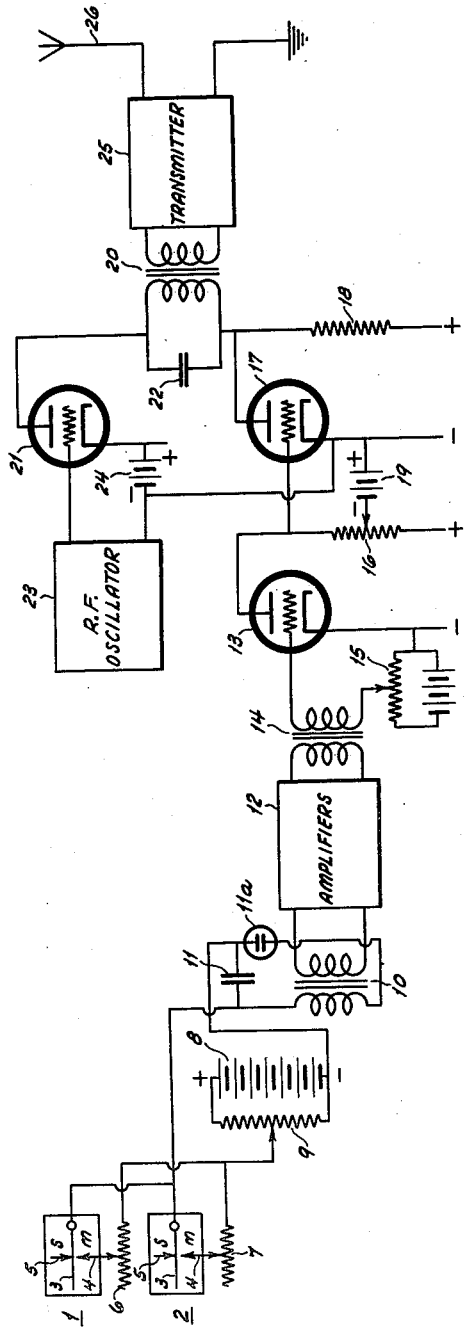
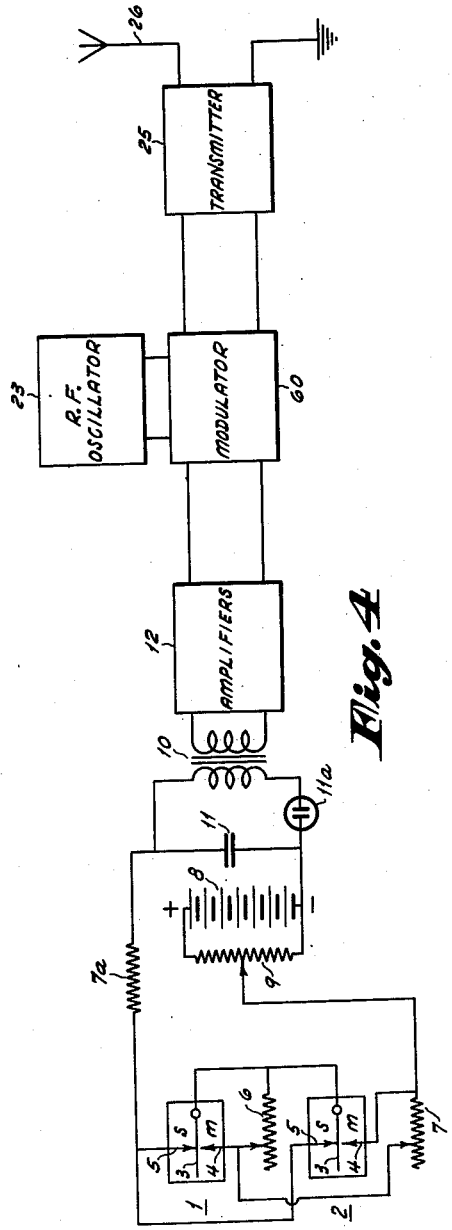
INVENTOR.
JOHN W. COX
BY
ATTORNEY

INVENTOR.
JOHN W. COX
BY
ATTORNEY

Nov. 10, 1942.    J. W. COX    2,301,373
MULTICHANNEL TELEGRAPH SYSTEM
Filed Oct. 26, 1940    3 Sheets-Sheet 3

INVENTOR.
JOHN W. COX
BY
ATTORNEY

Patented Nov. 10, 1942

2,301,373

UNITED STATES PATENT OFFICE 2,301,373

MULTICHANNEL TELEGRAPH SYSTEM

John W. Cox, Berkeley, Calif., assignor to Radio Corporation of America, a corporation of Delaware Application October 26, 1940, Serial No. 362,905

1 Claim. (Cl. 178—51)

This invention relates to multiplex systems and is an improvement in certain respects on the invention disclosed in my application issued as Patent No. 2,264,510 on December 2, 1941.

An object of the invention is to provide a multi-channel system without synchronous commutating or distributor mechanism, by use of different channel frequencies when the marks occur at different times and the same frequency when the marks occur simultaneously.

Another object is to provide a multi-channel system without synchronous distributors by transmitting different modulating frequencies at different times, transmitting no signal current when such channels send mark signals simultaneously and transmitting a third and different frequency when the transmitters send space signals.

Other objects will appear in the following description, reference being had to the drawings, in which:

Fig. 1 is a diagrammatic illustration of the transmitter system.

Figure 2:
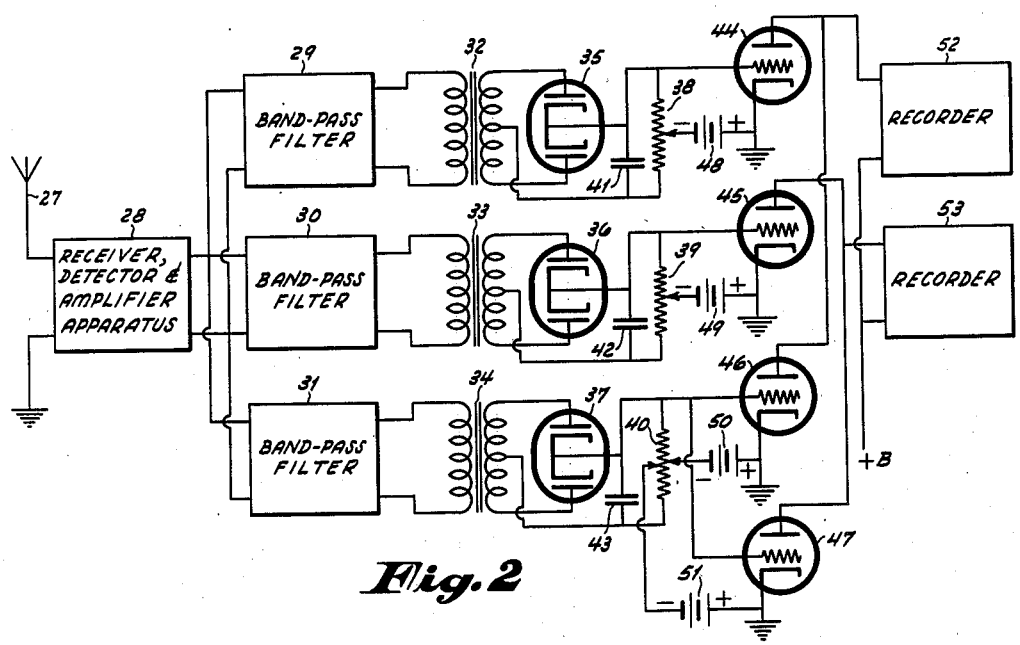
Fig. 2 is a diagrammatic illustration of the receiving system.
Figure 3:
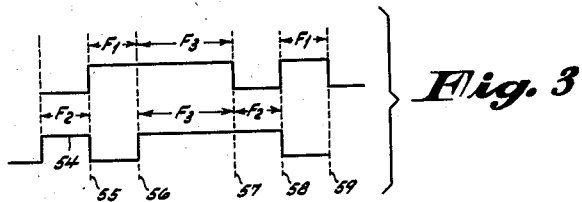

Fig. 3 contains graphs illustrating the principle of the invention of Figs. 1 and 2.

Fig. 4 is a modified form of transmitting system.

Figure 5:
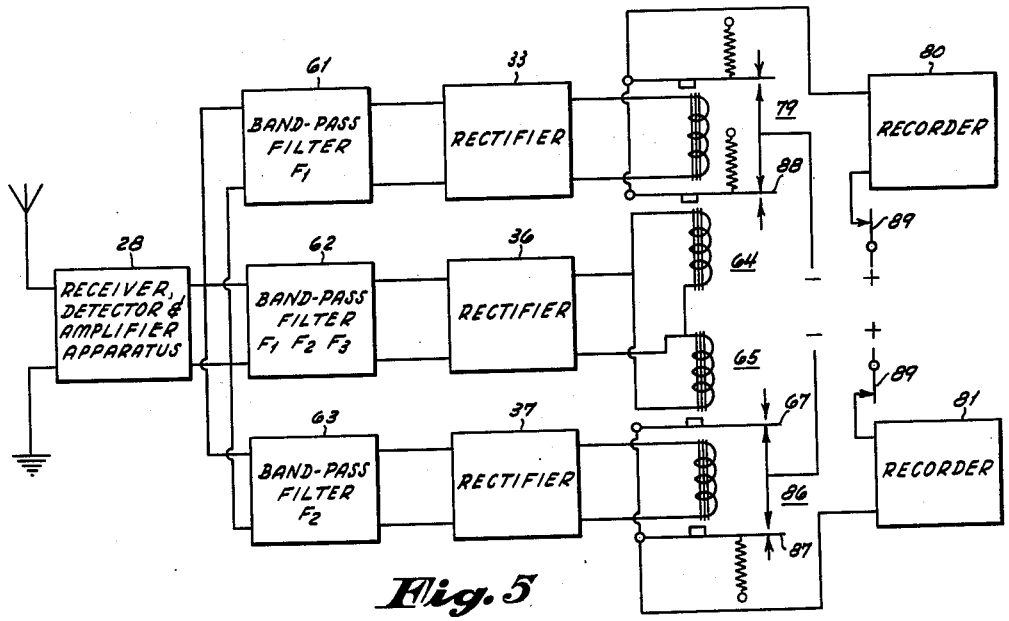

Fig. 5 is a receiving system for the modification of Fig. 4.

Figure 6:
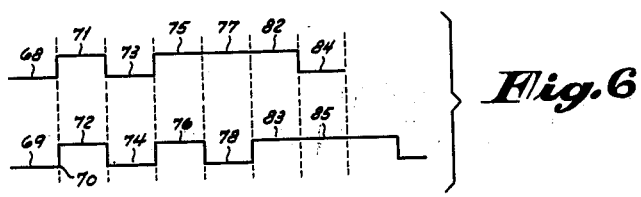

Fig. 6 contains graphs illustrating the principle of the invention of Figs. 4 and 5.

Figure 7:
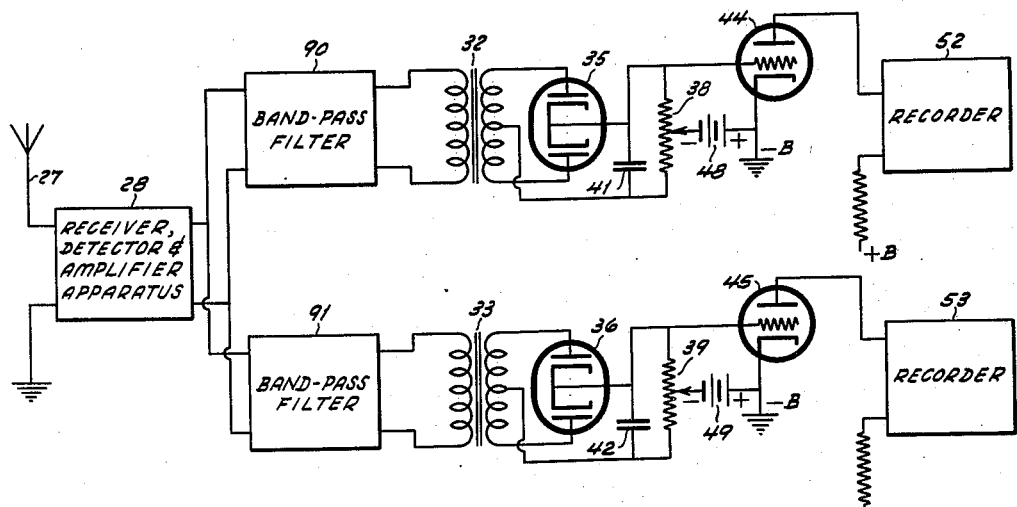

Fig. 7 is a modified form of receiver for the transmitter of Fig. 1, with certain frequency adjustments.

Referring to Fig. 1, 1 and 2 indicate tape or other transmitters for two individual channels to be combined in multiple transmission. These are well known and have been shown as movable switch arms 3, make contacts 4 and blank contacts 5. Contact 4 of transmitter No. 1 is connected to resistance 6 and contact 4 of transmitter No. 2 is connected to resistance 7. These two resistances are joined together and are connected to any source of E. M. F. such as battery 8 and potentiometer resistance 9. The switch tongues 3 are connected together and to one terminal of condenser 11 and to a terminal of the primary of transformer 10. The other terminal of the condenser is connected to one terminal of battery 8 and also to a terminal of a neon tube 11a or equivalent. The other terminal of the transformer is connected to the remaining terminal of the neon tube. The battery, condenser and neon tube constitute an oscillator, but various other oscillators may be used instead.

The secondary of the transformer 10 is connected to any desired number of amplifiers, generally indicated by block diagram 12, as such amplifiers are well known and per se constitute no part of the invention.

The output of amplifiers 12 is connected to the grid circuit of tube 13 through a transformer 14. This grid circuit has a bias source 15 adjusted to substantially block the tube 13 when no signal is impressed on the grid circuit.

The plate of tube 13 is connected to one terminal of load resistance 16. The positive terminal of the B source is connected to the other terminal of the resistance, and the negative to the cathode of the tube.

The grid-cathode or input circuit of tube 17 is adjustably connected to load resistance 16, so that the signal voltage is applied negatively to the grid. The positive terminal of the B source is connected through resistance 18 to the plate of the tube and the negative terminal to the cathode. The grid circuit may have a negative bias source 19 for adjusting the grid potential to the desired point on the characteristic curve.

The plate of tube 17 is connected through the primary of radio frequency transformer 20 to the plate of tube 21. This primary may be tuned to the radio frequency carrier by condenser 22. The grid-cathode circuit of tube 21 is connected to any desired radio frequency oscillator indicated by block diagram 23. The grid circuit may have the usual bias source 24 for regulation purposes. The cathode of tube 21 is connected to the negative of the B supply.

The secondary of transformer 20 is connected to transmitting apparatus of well-known type indicated by block diagram 25. The output of the transmitting apparatus is connected to antenna 26 and to ground.

In Fig. 2 the receiving antenna 27 and the ground terminal are connected to appropriate receiving apparatus consisting as usual of radio frequency amplifiers, detector and audio frequency amplifiers. The invention does not reside in these devices and any kind may be used. The receiving apparatus has thus been indicated in block diagram 28.

The output of the receiver 28 is connected in shunt to band-pass filters 29, 30 and 31 of standard form, indicated in block diagram. The output of the filters is connected through transformers 32, 33 and 34 to rectifiers 35, 36 and 37, respectively, across the output terminals of which are respectively connected load resistances 38, 39 and 40. The output of the rectifiers may be filtered by condensers 41, 42 and 43, respectively.

The input terminals of amplifier tubes 44, 45 and 46 are adjustably connected to the load resistances 38, 39 and 40, respectively. The input of a fourth amplifier tube 47 is also adjustably connected to load resistance 40. All these amplifying tubes have suitable negative bias sources 48, 49, 50 and 51 to operate at any desired part of the grid voltage-plate current characteristic. If zero amplifier plate current is desired for signal spaces, these sources would have such value as to block the tubes except upon the arrival of a signal positively applied to the grid circuits.

Recorder 52 is connected in the plate supply of tubes 44 and 46 in parallel, so as to be operated when either of these tubes responds to the signal. Recorder 53 is likewise connected in the plate supply lead of tubes 45, 47 in parallel, for operation by either of the tubes. The recorders may be of any type, such as the well-known syphon recorder or a photo recorder.

The operation of my invention will now be explained:

When a mark is transmitted by tape transmitter 1 and a space by transmitter 2, resistance 6 will determine the voltage applied to condenser 11 and a definite frequency $F_1$ will be generated by condenser 11 and neon tube 11a, in which is connected the primary of transformer 10. This condenser charges up to the breakdown voltage of the neon tube and discharges through the tube, as fully explained in my said copending application. Thus, a voltage of definite frequency $F_1$, set by resistance 6, is applied to transformer 10.

When a mark is being sent by transmitter 2 and a space by transmitter 1, resistance 7 will determine the charging time of condenser 11 and a different frequency $F_2$ is produced.

When both transmitters send a mark simultaneously, resistances 6 and 7 will be in parallel in the charging circuit of condenser 11 and, of course, will have a different value from either one alone. This will produce a third frequency $F_3$ in the primary of transformer 10. When neither tape transmitter sends a mark, no current will flow to the condenser 11 and both channels will send a space.

The signals of the two channels may be combined in any relation, but let it be assumed that channels No. 1 and No. 2 are sending the code letters N and A, respectively, in the time relation shown in Fig. 3. Tape transmitter 2 will cause the condenser-neon tube oscillator to produce the frequency $F_2$, which after amplification at 12 will cause tube 13 to unblock on the positive half cycles, which will block tube 17 and apply voltage to tube 21 that will cause the radio carrier frequency to be radiated by transmitter 25 and antenna 26 in a well-known way. Radiation will continue during the positive half cycles of $F_2$ throughout the time of the dot 54 (Fig. 3). That is, the radio carrier will be chopped at the frequency $F_2$.

When point 55 is reached, channel No. 1 commences to send the dash of letter N and transmitter channel No. 2 starts the space following dot 54. Resistance 6 now sets the frequency and the radio carrier will be chopped at frequency $F_1$. When the point 56 is reached, both channels will be transmitting and the parallel resistances 6 and 7 will set a new frequency $F_3$. The radiated wave will then be chopped at frequency $F_3$ up to the point 57, when channel No. 1 commences its space. From point 57 to point 58, the radiated wave will be chopped at frequency $F_2$. At this point channel No. 1 sends a mark and channel No. 2 a space. Therefore, the radiated wave will be chopped at frequency $F_1$ and this will continue to the point 59.

At the receiver the radiated wave is received, detected and amplified and in the output circuit there will be three frequencies, $F_1$, $F_2$ and $F_3$, occurring at different time intervals, as shown by Fig. 3. Frequency $F_2$ can pass only through the band-pass filter 30. After rectification and filtering at 36 and 42, the dot pulse 54 unblocks tube 45 and recorder 53 produces a dot. Recorder 52 at this time produces a space, as the frequency $F_2$ cannot pass either band-pass filter 29 or 31. If the bias used is not a blocking bias, the same result will be produced.

When point 55 is reached, frequency $F_1$ passes through band-pass filter 29 and unblocks tube 44, thus producing a mark portion in the dash of letter N. During this period the recorder 53 produces a space, as frequency $F_1$ cannot pass through filters 30 and 31.

When point 56 is reached, frequency $F_3$ passes through filter 31 and unblocks both of the tubes 46 and 47. The current in tube 46 causes recorder 52 to produce the remaining portion of the mark of the dash in letter N and tube 47 causes recorder 53 to simultaneously produce the first part of the dash in letter A.

At point 57, frequency $F_2$ passes filter 30 only and recorder 53 finishes the mark of the dash of letter A while the recorder 52 produces a space. At point 58, the arrival of the signal of frequency $F_1$ similarly causes recorder 52 to produce the dot of letter N while recorder 53 produces a space.

It is thus seen that channels No. 1 and No. 2 can transmit independently of each other without synchronizing apparatus or distributors and the channel recorders will faithfully produce the separate messages.

The oscillator need not be the condenser-neon tube type, as this has been described by way of example. Also, the modulator need not be of the type disclosed. The signals can modulate the radio carrier wave in any way desired. The chopping system is a satisfactory form of modulation and it was described as an example only.

At the receiver, tube 47 may be omitted and recorders 52 and 53 fed in parallel from the output of tube 46. Also, mechanical types of relays may be used in the place of tubes, if desired.

In the modification of Figs. 4 and 5, the reference characters 1 to 12, inclusive, indicate the same parts in the drawing as those used in Fig. 1 and these parts have the same functions as those of Fig. 1. However, the switch arms or tongues and contacts of the tape transmitter are differently connected in some respects, as will now be indicated.

The tongues 3 of the two transmitters are connected together and to one of the ends of resistances 6 and 7 and also to potentiometer resistance 9. The mark contact 4 of transmitter 1 is adjustably connected to both resistances 6 and 7. The mark contact 4 of transmitter 2 is connected to the other, or potentiometer, end of resistances 6 and 7. The space contacts 5 of both transmitters are connected together and to the junction point of condenser 11 and to the primary of transformer 10 through a resistance 7a, which may represent merely the inherent resistance of the condenser circuit outside of resistances 6 and 7. In all other respects the connections of Fig. 4 are the same as in Fig. 1, except that the keying and modulating apparatus 60 is shown in block diagram. This may be understood to contain all the parts 14 to 24 shown in Fig. 1, or the parts of any other known modulator.

In the receiver 28 of Fig. 5 all the apparatus referred to in connection with Fig. 1 will be used.

The output of the receiver is connected to the three band-pass filters 61, 62 and 63, and the output of these are respectively connected to rectifiers 35, 36 and 37, as in Fig. 1. For simplicity of explanation and illustration, I have shown the rectifiers connected to electromagnetic relays, but it will be understood that the amplifying stages shown in Fig. 2 may be used instead, as they would act in the same way.

The operation of the modification of Figs. 4 and 5 will now be described:

Referring to Fig. 4, when transmitter 1 sends marks with transmitter 2 sending spaces, resistance 6 will be short-circuited and the battery current will flow through resistance 7, mark contact 4 and tongue 3 of transmitter No. 1, tongue 3, space contact 5 of transmitter No. 2 and resistance 7a to the condenser 11. Resistances 7 and 7a will thus determine the oscillation frequency $F_1$. When the transmitters both are sending marks, no current can flow to condenser 11 and no frequency is generated.

When transmitter No. 2 sends a mark and transmitter No. 1 sends a space, current flows from the potentiometer slider through the mark contact and tongue of transmitter No. 1 and the tongue and space contact of transmitter No. 2 to the condenser 11 through resistance 7a. Thus, resistance 7a determines the frequency $F_2$.

When both transmitters are sending spaces, current will flow through resistances 7 and 6, the tongue and space contact of the transmitters in parallel and resistance 7a to the condenser. These three resistances will determine the oscillation frequency $F_3$.

The foregoing give the only possible connections in transmitting two signals independently of each other.

Let it be supposed that transmitter No. 1 is sending Morse code letter A and transmitter No. 2 Morse code letter S in the chance time relation indicated in Fig. 6. Both transmitters will be starting with spaces. This will produce frequency $F_3$, which will modulate the radio carrier and be received at receiver 28. The extracted frequency $F_3$ can pass only through wide band-pass filter 62. The rectified current of 36 will operate both relays 64, 65 and open the normally closed contacts 66, 67. This will form the spaces 68, 69.

At the point 70, both tape transmitters will be sending marks and no modulating current is produced. At the receiver there will, therefore, be no potential applied to the band-pass filters. None of the relays will be operated, but since contacts 66 and 67 are normally closed, the recorder will have its circuit closed and will record the marks 71, 72.

The spaces at 73, 74 will be recorded by frequency $F_3$, as already explained. Likewise, mark portions 75 and 76 will be produced by absence of any signal.

When portions 77 and 78 are reached, $F_1$ will be transmitted and recorded. This will pass only filters 61 and 62. Relays 79, 64 and 65 will thus operate. This will record a mark in recorder 80 and a space in recorder 81. Portions 82, 83 will be recorded by absence of a signal, as already explained, but when portions 84, 85 are reached, frequency $F_2$ will be sent out and received through filters 62 and 63. This will operate relays 64, 65 and 86, closing contacts 87 and opening contacts 66 and 67. This will produce a space 84 in recorder 80, as the circuit is interrupted, but the mark portion 85 will continue, since current flows to recorder 81 through contact 87.

The foregoing explains how marks and spaces are produced under all possible conditions and the completion of the letter S need not be referred to. It will be noted that the recorders, when idle, record a line having the amplitude of the marks instead of that of spaces, as is usual, though, of course, when the circuit is idle for any length of time the switches 89 may be operated to disconnect the power from the recorders.

If vacuum tubes are substituted for the mechanical relays in Fig. 5, they will secure the same result in exactly the way already described, as will be apparent from the explanation in connection with Fig. 2.

The broad band-pass filter 62 may be omitted, but is is preferred, since it will exclude interference occurring outside the band covered by $F_1$, $F_2$ and $F_3$.

Fig. 7 shows a modified receiver for the signals transmitted by Fig. 1, with proper adjustment of the resistances 6 and 7 to produce the desired frequency $F_1$, $F_2$, $F_3$. By way of example, assume that when channel No. 1 sends a mark separately, the frequency $F_1$ will be 900 cycles per second; when channel No. 2 sends a mark separately, the frequency $F_2$ will be 1,000 and when both channels mark together, the frequency $F_3$ will be 500. With these assumed values, band-pass filter 90 will be designed to pass frequencies 500 to 900, inclusive, and filter 91 to pass a frequency of 1,000.

In the signals of Fig. 3, the initial dot 54 would be transmitted and received as frequency $F_2$, or 1,000. This frequency will be able to pass filter 91 only. Thus, a dot will be recorded in recorder 53 and a space will be recorded in recorder 52. Between points 55 and 56, the frequency sent and extracted will be $F_1$, or 900. This will pass filter 90 and record a mark portion in recorder 52. Recorder 53 will record a space at this time. At point 56, a frequency $F_3$, or 500, will be sent and extracted. The frequency of 500 will pass through filter 90 and a mark will be recorded by recorder 52. The second harmonic of the frequency $F_3$, or 1,000, will, of course, pass filter 91 and a mark portion will be recorded by recorder 53, since the signals will inherently have a sufficient amount of harmonics. Further explanation will be unnecessary, as it will now be apparent how any signal will be sent and recorded for each channel in this modification.

It will not be necessary to use the second harmonic of the frequency $F_3$. By proper choice of values, other harmonics may be used.

Having described my invention, what I claim is:

In a two channel system, the method of receiving signals having fundamental and inherent harmonic components of a first frequency when one channel alone is transmitting, a second frequency when the two channels are transmitting simultaneously, and a third frequency, harmonic to said second frequency, when the other channel alone is transmitting, which comprises passing the first and second frequencies to one indicator through a filter having an upper cut-off below said third frequency, and passing the inherent harmonic of the second frequency and said third frequency to another indicator through a filter having a lower cut-off above the first frequency.

JOHN W. COX.